March 8, 1927. 1,620,514
C. BRYNOLDT
ART OF MOLDING CONCRETE OR CEMENTITIOUS STRUCTURES
Filed Jan. 29, 1923 6 Sheets-Sheet 1
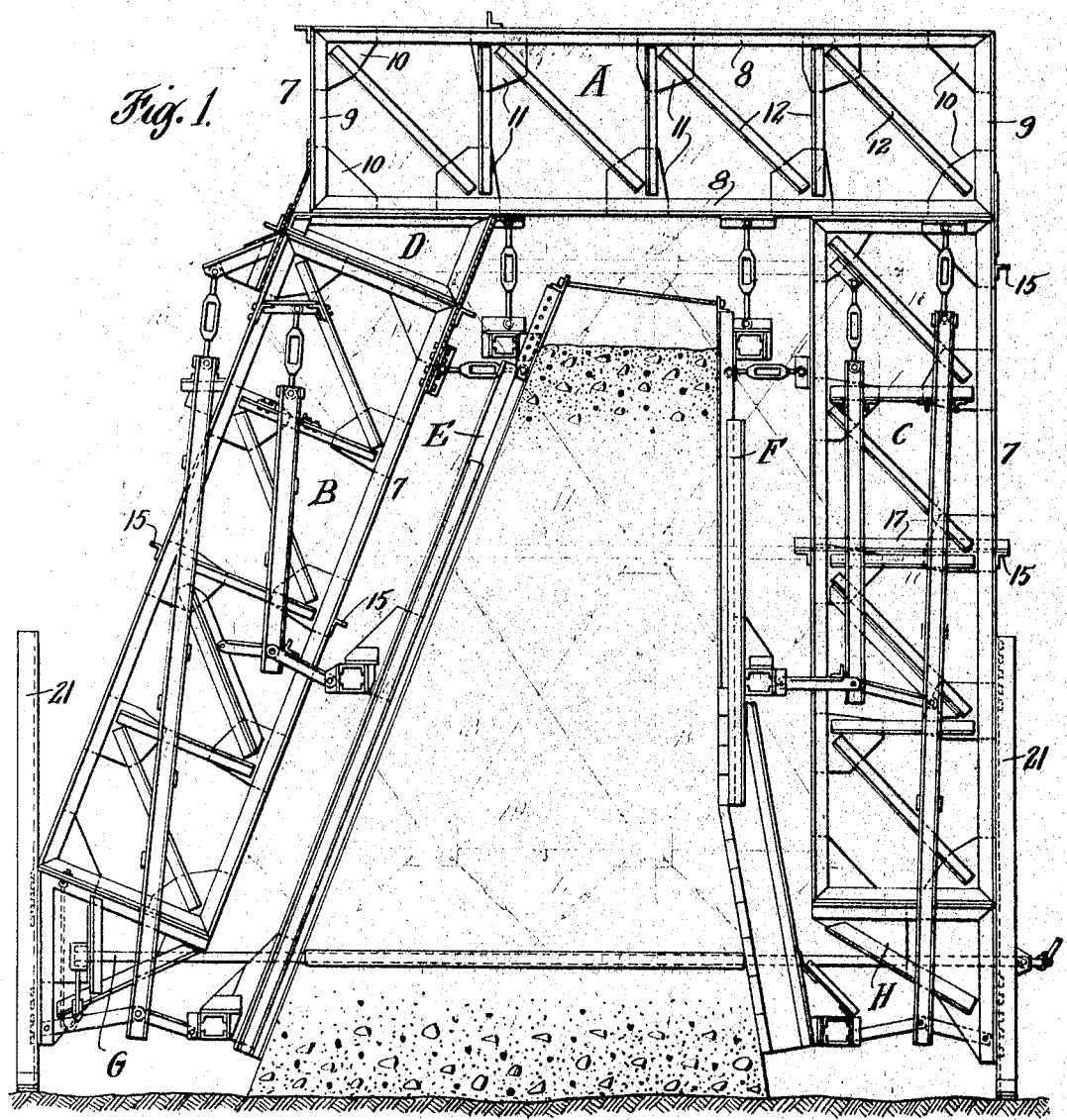
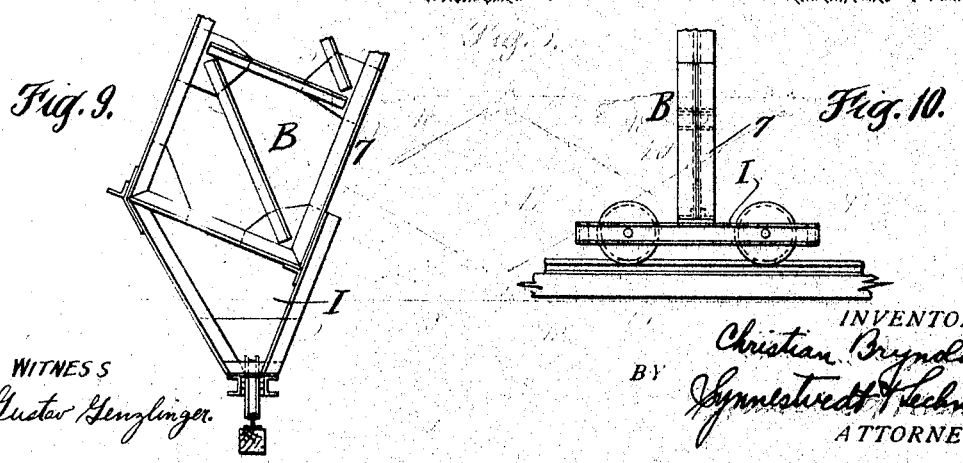

March 8, 1927. 1,620,514
C. BRYNOLDT
ART OF MOLDING CONCRETE OR CEMENTITIOUS STRUCTURES
Filed Jan. 29, 1923 6 Sheets-Sheet 2

WITNESS
Gustav Genzlinger

INVENTOR
Christian Brynoldt
BY
Synnestvedt & Lechner
ATTORNEYS

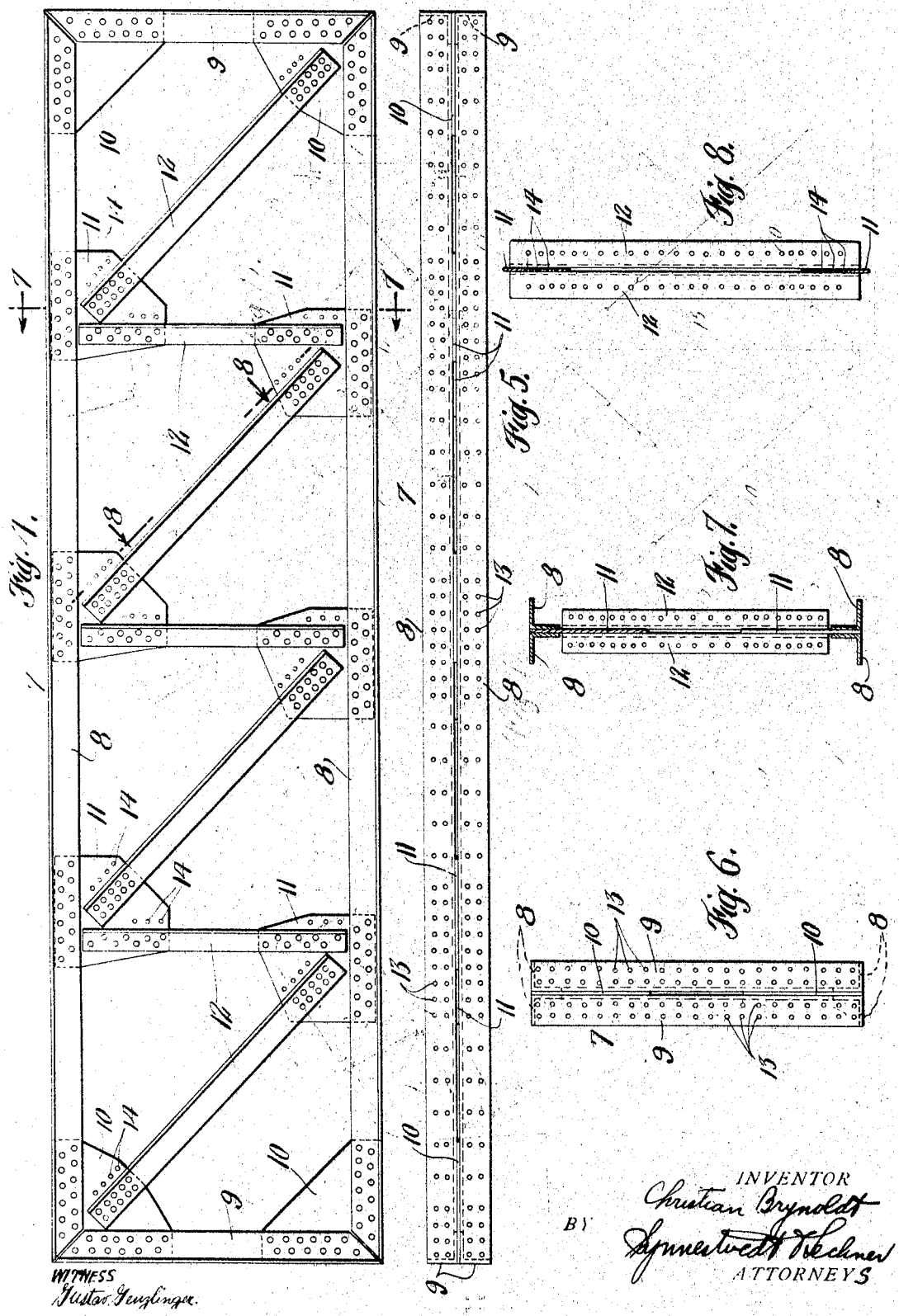

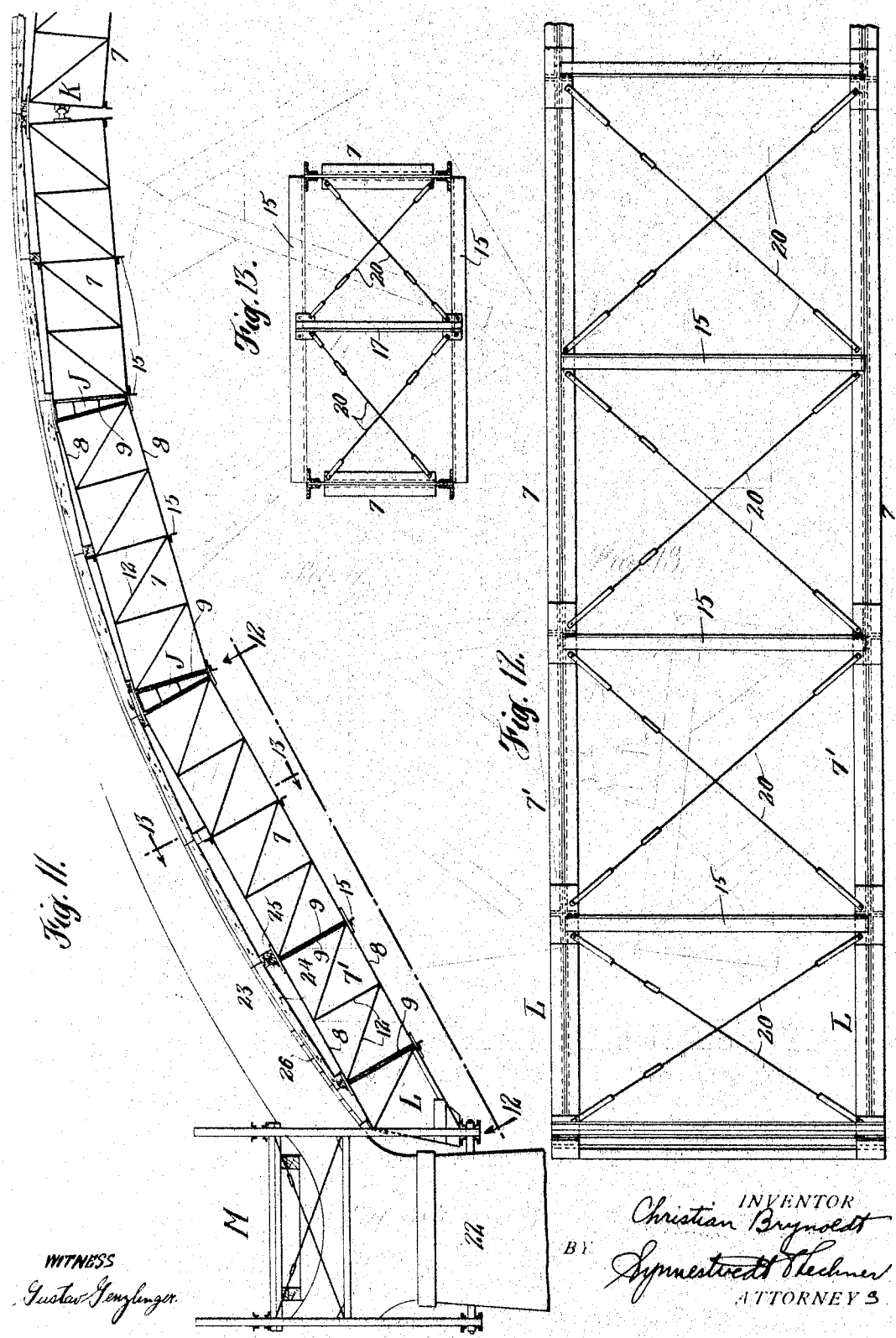

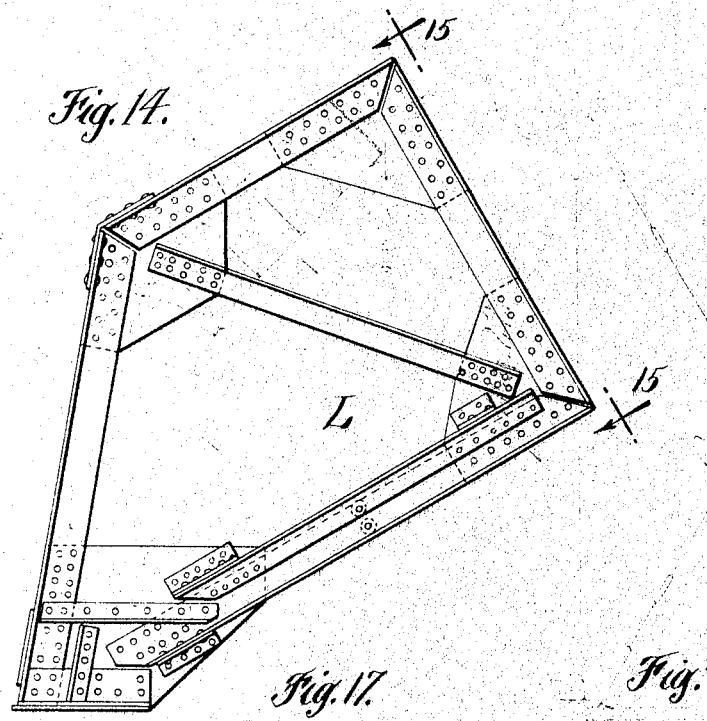
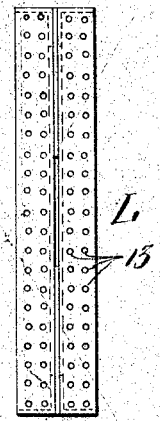
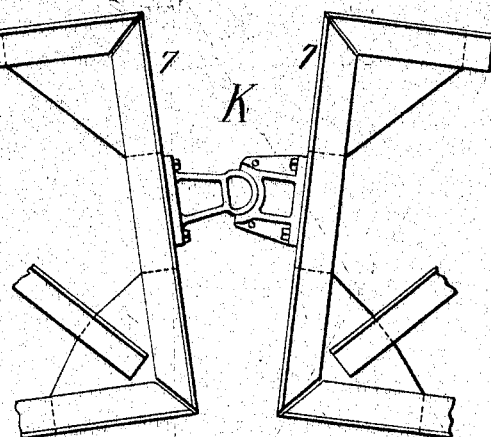
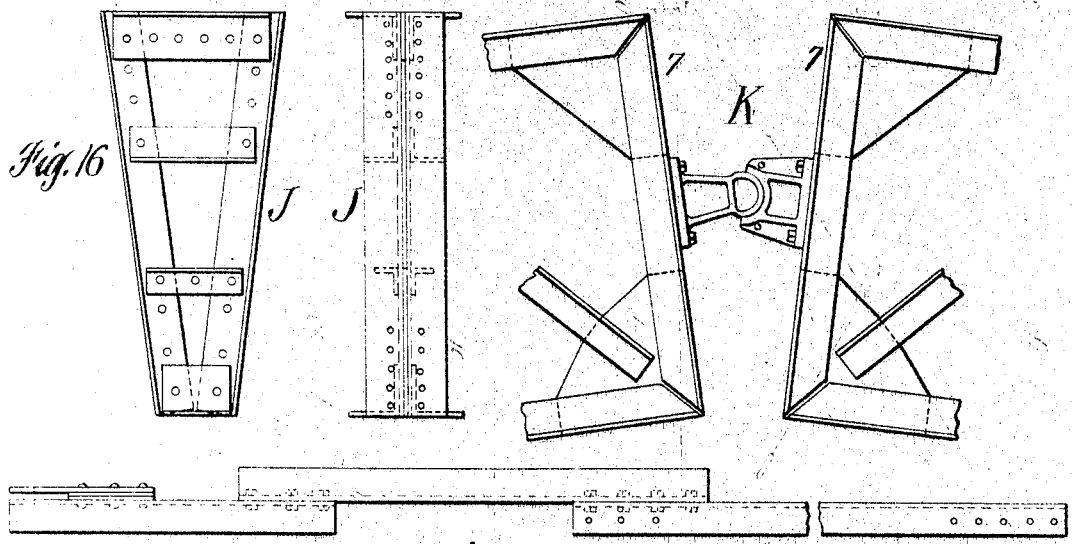
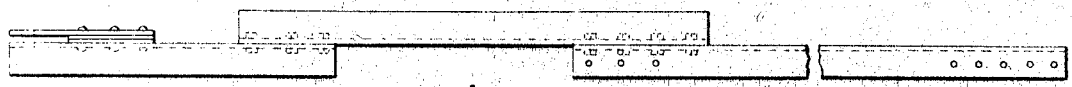

March 8, 1927. 1,620,514
C. BRYNOLDT
ART OF MOLDING CONCRETE OR CEMENTITIOUS STRUCTURES
Filed Jan. 29, 1923 6 Sheets-Sheet 6
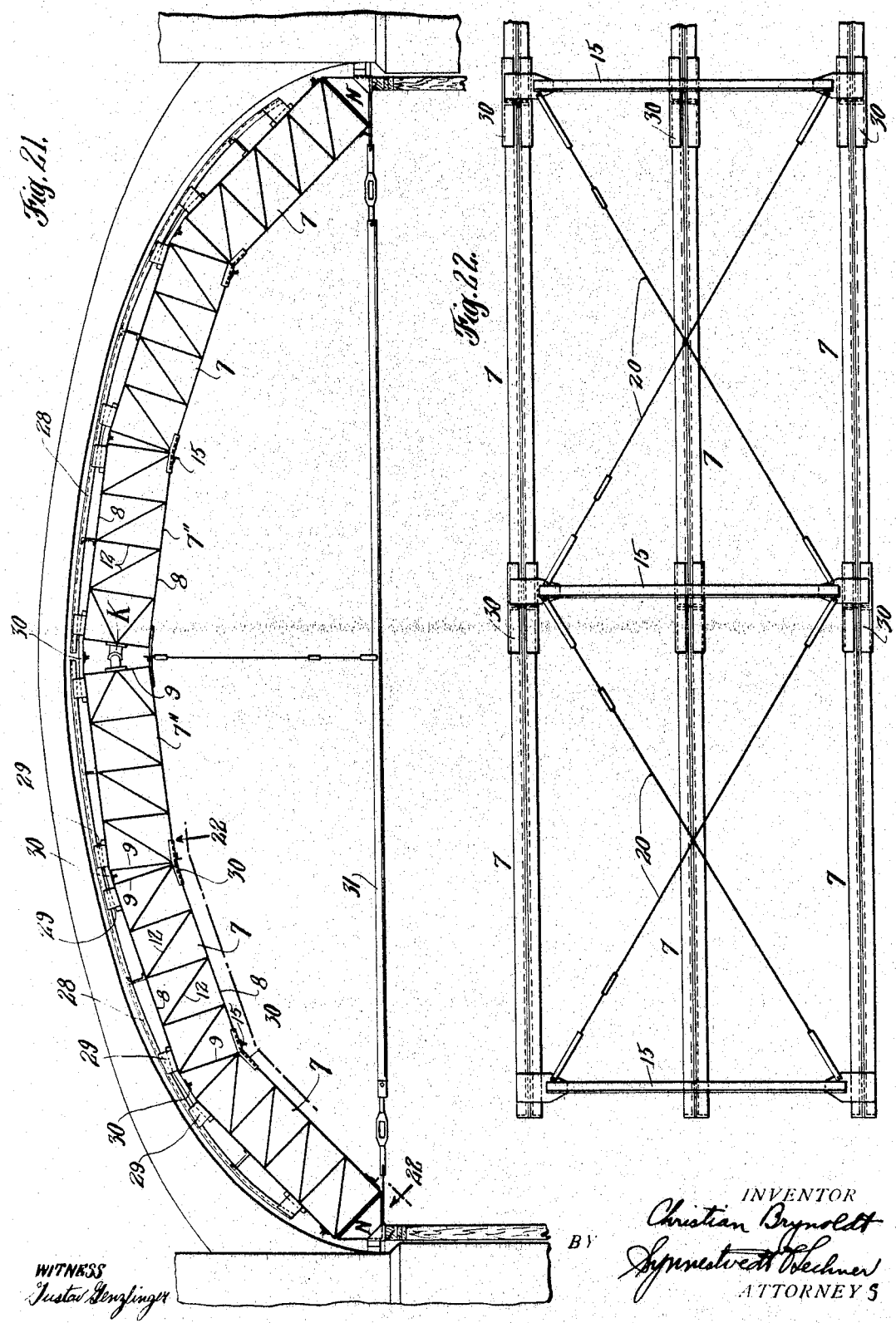

Patented Mar. 8, 1927.

1,620,514

UNITED STATES PATENT OFFICE.

CHRISTIAN BRYNOLDT, OF PITTSBURGH, PENNSYLVANIA, ASSIGNOR TO BLAW-KNOX COMPANY, A CORPORATION OF NEW JERSEY.

ART OF MOLDING CONCRETE OR CEMENTITIOUS STRUCTURES.

Application filed January 29, 1923. Serial No. 615,480.

This invention has to do with improvements in the art of molding concrete or cementitious structures, such for example as retaining walls, sea walls, walls under water, bridges, viaducts and the like, and relates to both method and apparatus.

The nature of my invention and its objects and advantages will be best understood from a brief statement of present practice in molding such structures.

In molding such structures, it is customary to use either permanent molds repeatedly used as the work progresses; or a mold which is a structure built "on the ground" and which is expected to be completely dismantled and scrapped after a single use. In both cases the mold forms must, of course, be supported by suitable supporting structure, the size, shape and strength of which varies with the particular work in hand. This structural supporting work has been thus as widely variant as the work in connection with which it was to be used, and for each undertaking, generally speaking, a supporting structure has to be constructed "on the ground" to meet the requirements peculiar to that undertaking. Such a structure is incapable of repeated use and is scrapped, and this involves considerable expense in erection and in loss through scrapping. It will be seen that the larger the operation the more serious do these factors become.

It is the primary purpose of my invention to overcome these difficulties by the construction of the supporting structures from parts of such character that they may be coupled together into knock down yet rigid structures having such variety of shapes, strength, and sizes as will generally meet the varying requirements of this class of work, the parts being used over and over again.

More specifically stated, it is the object of my invention to provide certain main standard parts for mold supporting structures, so constructed and arranged that they may be directly or indirectly coupled into knock down rigid units of such size, shape, strength and contour as will meet requirements of the general run of work, with little or no exception; and to provide auxiliary standard parts for connecting and bracing the main standard parts into large units of desired shape, size and strength, the main and auxiliary standard parts having attaching or connecting means of the same or a correlative order for this purpose, and the auxiliary parts being thus themselves capable of assemblage into auxiliary units for use in connection with the main units; and these standard parts being kept in stock, sent out for use, returned and reused, thus reducing the wastage to the scrapping of such few special pieces as may be required in certain instances.

The foregoing, together with such other objects as may hereinafter appear or are incident to my invention, I obtain by means of improvements, the preferred forms of which are illustrated in the accompanying drawings, wherein:

Fig. 1 is an end elevation of a frame for use in constructing a wall under water, illustrating how such a frame may be constructed out of standard parts in accordance with my invention.

Fig. 4 is an enlarged side elevation of one of the main standard trusses utilized in constructing the traveler of Fig. 1.

Fig. 5 is a bottom plan of Fig. 4.

Fig. 6 is an end elevation of Fig. 4.

Figure 2:
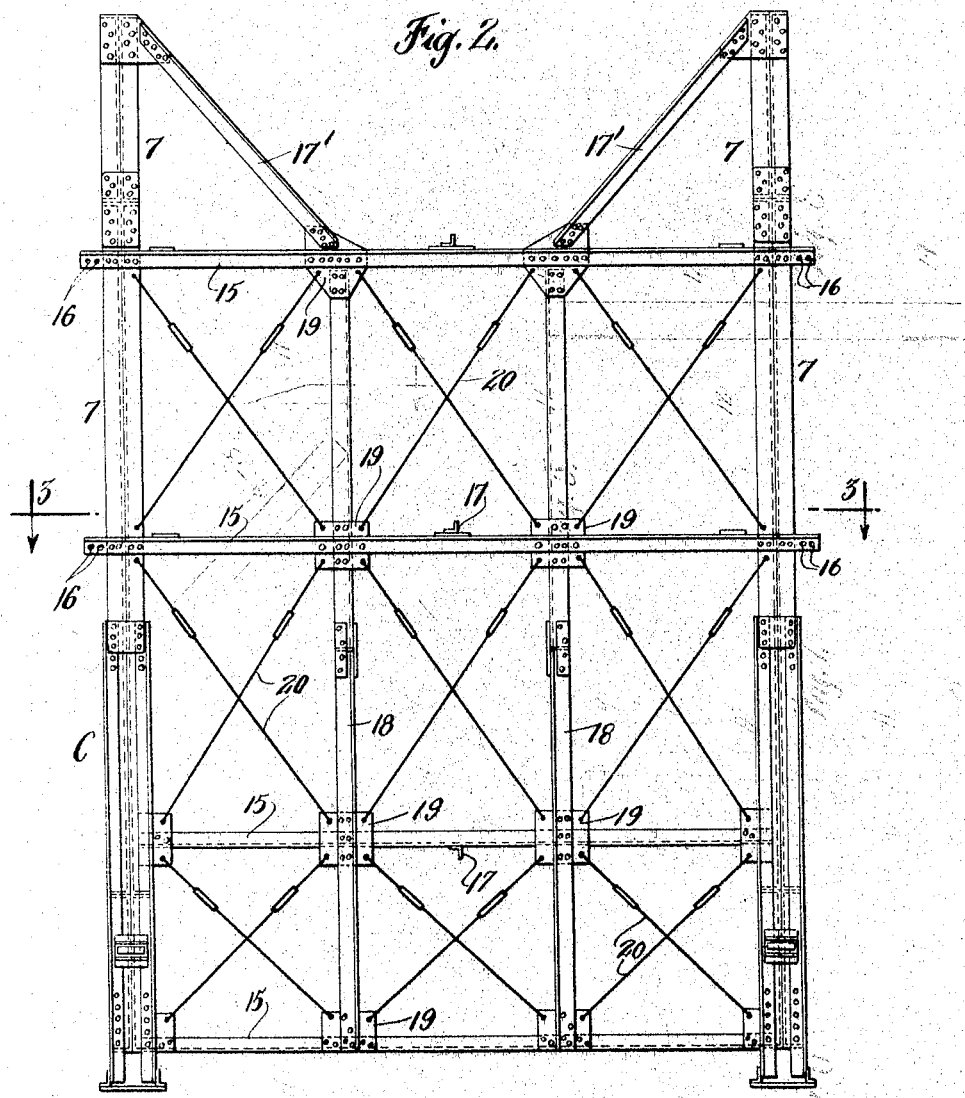
Fig. 2 is an elevation of the right-hand side of the traveller of Fig. 1.
Figure 3:
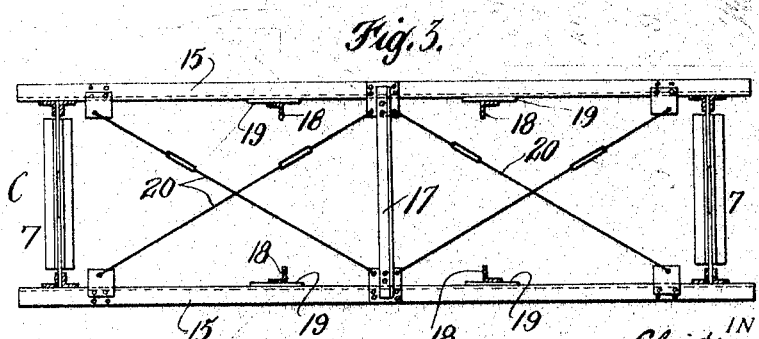
Fig. 3 is a section taken on the line 3—3 of Fig. 2.

Figs. 7 and 8 are sections taken respectively on the lines 7—7 and 8—8 of Fig. 4.

Figs. 9 and 10 are views of special details illustrating how the traveller of Fig. 1 may be altered into a traveller for erecting land walls, sea walls and the like.

Fig. 11 is a diagrammatic view illustrating how the standard parts may be united to form a supporting structure for a bridge.

Fig. 12 is an enlarged bottom plan of a portion of the structural work of Fig. 11 looking in the direction of the arrows 12—12.

Fig. 13 is a cross section taken on the line 13—13 of Fig. 11.

Fig. 14 is a side elevation of a special auxiliary piece for the construction employed in Fig. 11.

Fig. 15 is an end elevation of Fig. 14 looking in the direction of the arrows 15—15.

Figs. 16 and 17 are respectively a side and end elevation of another such special auxiliary.

Fig. 18 is a fragmentary side elevation of still another special auxiliary.

Figs. 19 and 20 are views illustrating how certain standard auxiliary parts may be coupled together for extension purposes.

Fig. 21 is a diagrammatic view illustrating the application of my improvements to another form of bridge structure; and Fig. 22 is an enlarged bottom plan view looking in the direction of the arrows 22—22 of Fig. 21.

Referring now to Figs. 1 to 8 inclusive, the nature of my invention will be described in the construction of a traveller for erecting walls, on land or under water. These travellers are ordinarily of a general inverted U-shape, the legs of the traveller being adapted to straddle the work and the mold sections for molding the wall, as well as the bulkheads, are suspended from the traveller for adjustment and also for collapse away from the work. Where the wall has a sloping face, one of the legs is correspondingly inclined. In some cases, where the nature of the work permits of it, one of the legs of the traveller may be entirely dispensed with. The traveller functions to take the thrust of the concrete or in other words, to properly support the mold sections in place during the casting and until the concrete has sufficiently set; to support the mold sections for collapse; and to transport the mold sections from point to point, as the work progresses.

In the traveller for the under water wall of Fig. 1, the reference letter A denotes the base and the reference letters B and C the two legs of the traveller. Generally speaking, the base and the two legs are each composed of main standard truss frames 7, the number of which depends, of course, on the character of the work being done. Ordinarily, at least two suitably spaced truss frames are required for the base and the legs, as will be clear from inspection of Fig. 2, such standard truss frames being coupled and braced by standard auxiliary pieces, into a larger, rigid, knock down unit of the needed size and strength.

Each standard truss frame preferably consists of a rectangular frame composed of a pair of side members each composed of a pair of angles 8; end members each composed of a pair of angles 9; gusset plates 10 at the corners between the pairs of angles 8 and 9 riveted to each; the intermediate gusset plates 11 lying between the angles 8 composing the side members and riveted thereto; and the connecting members 12, disposed so as to constitute the whole frame into a truss. The laterally extending legs of the angles 8 and 9 are each provided with a plurality of holes 13, the order of spacing of which is the same or at least correlative. In the drawings, the angles 9 are provided with holes spaced apart three inches, and the groups of holes in the angles 8 are spaced three and six inches apart. The gussets also have holes or sets of holes 14, the spacing of which is of the same order as the other holes or of a correlative order. This is also true of the members 12. In consequence of this arrangement, standard truss frames may be arranged end to end and detachably bolted together; or side to side; or side to end, substantially, at any point throughout the length of the side members. Thus the standard trusses may be coupled directly— or indirectly, as will be further pointed out—into a unit, and units may be detachably coupled together into still larger units by the auxiliary cross braces or tying members bolted either to the side or end angles or to the gusset plates, or to the members 12, as will now be described.

Referring to Figs. 1 and 2, it will be seen that in the two main truss frame units, the truss frames for the legs C are directly coupled at their upper ends to the bottom side members of the respective truss frames of the base A; and the truss frames constituting the legs B are indirectly coupled to the bottom sides of the respective trusses of the base, through interposed auxiliary triangular frame members D, also constructed of angles arranged as before and provided with holes at the periphery, the spacing of which is of the same or of a correlative order. The two main units are detachably coupled and connected onto the larger unit by the longitudinally extending bracing and tying auxiliary standard members 15, each preferably consisting of an angle provided with holes 16, the spacing of which is of the same or of a correlative order as those previously described. These tying members 15 are preferably arranged on opposite sides of the standard trusses 7; and they may be horizontally tied together and braced, intermediate their ends, by means of tying auxiliary standard members 17, also preferably composed of angles, punched as before. The tying members 15 may also be coupled and braced, by vertically extending tying auxiliary standard members 18, through the medium of gusset plates 19, punched as described. The members 18 and 15, may be built up of standard lengths of angles, punched as before and assembled as indicated, for example, in Figs. 19 and 20. The trusses of the base are braced by the auxiliaries 17' through the medium of gussets. The whole of the frame may be tied together diagonally by means of diagonal turnbuckle devices 20 strung in the punchings in the parts to which their ends are respectively coupled.

It will be seen from the foregoing that in so far as the tying or coupling of main units into a large unit is concerned, this is done by a minimum number of standard auxiliaries in the shape of a few different lengths of angles, turnbuckles and some gussets, the punchings making it possible to meet wide variations in dimension, shape and disposition of parts to secure the needed strength.

At the bottom of the legs, angular triangular members G and H, constructed in a manner similar to the triangular pieces D, may be employed in order to provide a proper support for the members 21 which serve to position the traveller on the uneven bottom. These members 21 are punched as before and in fact, the tying pieces such as the members 15, 17 or 18, or coupled lengths thereof may be employed for this purpose.

The traveller described may be converted into a land traveller, i. e., a traveller for constructing work on land, by substituting carriages I for the members G and H at the bottom of the legs of the traveller. It will be understood that the carriage frames are composed of angle members punched as before.

Referring now to Figs. 11 to 13 inclusive, the application of my invention in constructing a supporting structure for forms for bridges will be described. It will be seen on inspection of Fig. 11 that the standard trusses 7, with an occasional standard truss 7' of half length, are arranged in the form of chords of a circle or arc of the desired character through the medium of interposed correspondingly punched angular pieces J, the degree of angularity of which depends upon the radius of the circle or arc of which the trusses are to constitute chords. This, of course may vary with the particular work in hand, and thus the pieces J may in some instances be incapable of reuse. It will, of course, be understood that two or more of the trusses are used for each chord, depending upon the width and load of the structure being erected, etc., and that such standard trusses are connected as before by standard auxiliaries, which serve to tie the standard trusses into a larger unit or frame. The foregoing will be clear on inspection of Figs. 12 and 13. In the center or crown, a terminal hinge device K is interposed between the middle trusses; and at the end pieces L are provided as a means for carrying the mold supporting structure on the brackets M which are supported on the precast piers 22. The construction of the pieces J, K and L is shown in Figs. 14 to 18 inclusive.

The brackets M surround the precast piers and are built up from the standard auxiliary parts before described and are capable of wide variation.

The mold 23 is a built up structure made on the ground comprising the supporting pieces 24 carried on suitably shaped cross pieces 25 in turn carried on the chords, and the lagging 26.

In Fig. 21, I have illustrated another way in which a supporting structure for the molding means for bridges may be constructed of the standard parts. Here, as in the case of the arrangement of Fig. 11, pairs of suitably spaced standard truss frames 7 and 7" are transversely connected and braced by the standard auxiliaries, the contour desired being obtained by splicing curved metal auxiliaries or false rafters 28, as at 29, to the mold supporting structure. The mold is carried on the curved auxiliaries 28. In this case the pieces J may be dispensed with and in lieu thereof overlapping strap pieces 30 may be provided at the top and bottom of the truss frames, the configuration of such pieces corresponding to the angularity of the adjacent ends of trusses with respect to each other. End pieces N are provided for supporting the ends of the mold support; and the piers are relieved of the thrust by means of the tension turnbuckle members 31.

Generally, therefore, the main standard trusses may be connected end to end to form a long straight truss, and when used in this way, as the overall length increases, more of them must be used and placed closer together to support the load. By the use of triangular, intermediate triangular and terminal triangular pieces, arched structures may be formed of approximately any desired contour, the exact contour being obtained by auxiliaries of wood or metal. In structures comprising numbers of parallel or approximately parallel main trusses, the required transverse stiffening to prevent buckling may be obtained by the auxiliaries arranged, for example, in truss or other form or by turnbuckles or both.

The half length standard trusses and also, in some instances, the auxiliaries provide for variations in length not possible with full length trusses, in traveller, bridge and other supporting structures.

What I claim is:

1. The herein described method of constructing supporting devices for forms, molding means and the like for concrete structures which consists in utilizing standard structural trusses and detachably uniting the same in edgewise abutment in a knock-down but rigid supporting unit.

2. The herein described method of constructing supporting devices for forms, molding means and the like for concrete structures which consists in utilizing standard structural substantially rectangular trusses and detachably uniting the same in edgewise abutment in a knock-down but rigid supporting unit.

3. The herein described method of constructing supporting devices for forms, molding means and the like for concrete structures which consists in utilizing standard structural trusses and detachably uniting the same in a knock down but rigid supporting unit, through the medium of members interposed between them for edgewise abutment, thus producing the desired general contour of the unit.

4. The herein described method of constructing supporting devices for forms, molding means and the like for concrete structures which consists in utilizing standard structural trusses and detachably uniting the same in a knock down but rigid supporting unit through the medium of members interposed between them for edgewise abutment and serving as means through which adjacent units may be connected into a still larger unit.

5. The herein described method of constructing supporting devices for forms, molding means and the like for concrete structures which consists in utilizing standard structural trusses and detachably uniting the same in edgewise abutment in a knock down but rigid supporting unit, said trusses being provided with means whereby they may be directly coupled together or indirectly through interposed members.

6. The herein described method of constructing supporting devices for forms molding means and the like for concrete structures which consists in utilizing standard structural trusses and detachably uniting the same in edgewise abutment in a knock down but rigid supporting unit, said trusses being provided with means whereby they may be directly coupled together or indirectly through interposed members and adjacent units may be connected into a still larger unit.

7. The herein described method of constructing supporting devices for forms molding means and the like, for concrete structures which consists in utilizing substantially rectangular standard structural trusses and detachably uniting the same in edgewise abutment in a knock down but rigid supporting unit, said trusses being provided on their peripheral or outer edge portions with means whereby they may be directly coupled together or indirectly through interposed members.

8. In a temporary supporting mechanism for concrete structures, main frames provided with means for attachment of such an order that frames may be coupled edgewise end to end, side to side, and end to side, directly or indirectly and auxiliaries having connecting means of a similar order for indirectly connecting said main frames.

9. In a temporary supporting mechanism for concrete structures, main frames provided with means for attachment of such an order that frames may be coupled edgewise end to end, side to side, and end to side, directly or indirectly and auxiliaries having connecting means of a similar order for coupling said frames into larger units.

10. In a temporary supporting mechanism for concrete structures, main frames provided with means for attachment of such an order that frames may be coupled edgewise end to end, side to side, and end to side directly or indirectly and auxiliaries having connecting means of a similar order for coupling said frames into larger units, said auxiliaries being also thereby capable of assemblage into units.

11. In a temporary supporting mechanism for concrete structures, the combination of standard trusses of substantially similar construction provided at their peripheries with a plurality of spaced bolt holes of the same or a correlative order, whereby they may be connected edgewise into a number of useful relationships, and curved auxiliary means for the outer periphery when the standard trusses are assembled in arched form to provide the desired contour.

In testimony whereof, I have hereunto signed my name.

CHR. BRYNOLDT.